Patented May 2, 1939

2,156,731

UNITED STATES PATENT OFFICE 2,156,731

AZO DYESTUFF INSOLUBLE IN WATER AND FIBER DYED THEREWITH

Max Lange, Frankfort-on-the-Main, and Theodor Jacobs, Wiesbaden, Germany, assignors to General Aniline Works, Inc., New York, N. Y., a corporation of Delaware No Drawing. Application March 4, 1937, Serial No. 129,103. In Germany March 4, 1936

8 Claims. (Cl. 260—155)

The present invention relates to azo dyestuffs insoluble in water and to fiber dyed therewith; more particularly it relates to dyestuffs of the following general formula:

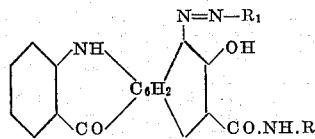

wherein R stands for a member of the group consisting of radicals of the benzene and naphthalene series and $R_1$ for a member of the group consisting of radicals of the benzene, naphthalene and anthraquinone series.

The use of arylides of hydroxy-ortho-carboxy-benzo-acridones capable of combining in ortho-position to the hydroxyl-group for the manufacture of azo dyestuffs has hitherto not been known.

Now, we have found that valuable azo dyestuffs insoluble in water may be obtained by combining in substance, on the fiber or on a substratum adapted for the production of lakes any diazo-compound with an arylide of hydroxy-ortho-carboxy-benzo-acridones, only such components being used as do not contain in the diazo- or in the arylide radical any group lending solubility such as the sulfonic acid or carboxylic acid group.

The use of the arylides of hydroxy-ortho-carboxy-benzo-acridones instead of the known 2,3-hydroxy-naphthoic acid-arylides as azo-components produces, unexpectedly, a considerable displacement of the shades of the respective dyestuffs towards the olive-green side of the spectrum so that the invention leads to tints which hitherto could not be obtained in this manner. In view of the importance of the dyestuffs from the series of 2,3-hydroxynaphthoic acid-arylides, for instance, for the manufacture of ice colors, such an extension of the color scale is of particular technical importance. The new dyestuffs are distinguished by good properties of fastness, especially by a good fastness to light.

The arylides of hydroxy-ortho-carboxy-benzo-acridones used as coupling components may be obtained according to the process of our copending application Ser. No. 129,102, filed March 4, 1937, by condensing in known manner a hydroxy-ortho-carboxy-benzoacridone with a primary arylamine which does not contain a sulfonic acid or carboxylic acid group.

The hydroxy-ortho-carboxy - benzoacridones used as parent materials are obtainable by heating an ortho-carboxyphenylamino-2-hydroxy-naphthalene-3-carboxylic acid with concentrated sulfuric acid to temperatures between about 80° C. and about 130° C.

The following examples serve to illustrate the invention, but they are not intended to limit it thereto:

(1) 1 gram of the anilide of 4'-hydroxy-5'-carboxy-1,2-benzoacridone of the formula

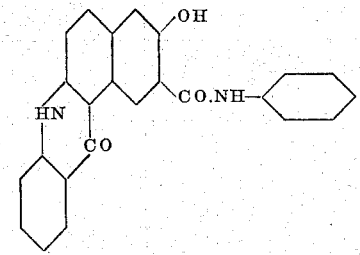

is dissolved in 5 cc. of alcohol, 1 cc. of caustic soda solution of 34° Bé. and 3 cc. of water. The solution is stirred into a mixture of 4 grams of sulfite cellulose waste liquor, 10 cc. of caustic soda solution of 34° Bé., 1 gram of oleyl-methyl-taurine and 200 cc. of hot water. At 35° C. the whole is made up with water to 1 liter.

50 grams of cotton are grounded with this solution. The yarn is squeezed and developed with a diazo-solution feebly acid with acetic acid and containing the diazo-compound from 1.38 grams of 4-nitro-1-aminobenzene. After developing, the material is rinsed and soaped at boiling temperature. An olive-green dyeing of good properties of fastness is obtained.

(2) 41 grams of the anilide of 4'-hydroxy-5'-carboxy-1,2-benzoacridone are dissolved in 200 cc. of alcohol, 40 cc. of caustic soda solution of 34° Bé. and 120 cc. of water. The solution is poured into a solution of 400 cc. of caustic soda solution of 34° Bé. and 4000 cc. of water. To this solution which has been cooled to 0° C. there is run a diazo-solution prepared in the usual manner from 13.8 grams of 4-nitro-1-aminobenzene. Such a quantity of glacial acetic acid is then added as is necessary to obtain a feebly acid reaction of the dyestuff liquor to litmus paper. The dyestuff formed is filtered with suction and dried. It is a dark olive-green powder and has the following formula:

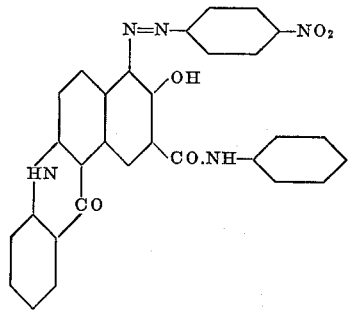

The following table indicates a number of other azo dyestuffs obtainable by the present invention:

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azo dyestuffs of the following general formula:

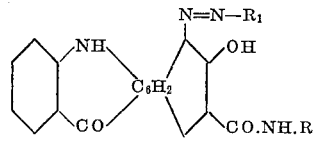

wherein R stands for a member of the group consisting of phenyl, methoxy-phenyl, methyl-methoxy-phenyl and naphthyl and $R_1$ for a member of the group consisting of phenyl, substituted phenyl, naphthyl and anthraquinonyl, yielding, when produced on the fiber, in general green, olive and brown shades of good fastness properties, particularly of good fastness to light.

| Diazo-component | Coupling component | Shade |
|---|---|---|
| 4-chloro-2-methoxy-1-aminobenzene | Anilide of 4'-hydroxy-5'-carboxy-1,2-benzoacridone | Olive-green. |
| 2-nitro-4-methyl-1-aminobenzene | do | Do. |
| 4-chloro-2-nitro-1-aminobenzene | do | Do. |
| 4-nitro-2-methoxy-1-aminobenzene | do | Olive-grey. |
| 2,5-dichloro-1-aminobenzene | do | Do. |
| 5-nitro-2-methoxy-1-aminobenzene | do | Do. |
| 3-chloro-1-aminobenzene | do | Olive-green. |
| 2-nitro-4-methoxy-1-aminobenzene | do | Do. |
| 2-chloro-1-aminobenzene | do | Olive-grey. |
| 4'-methoxy-4-amino-diphenylamine | do | Violet-grey. |
| 2',3-dimethyl-4-amino-azobenzene | do | Olive. |
| 4-nitro-2-methoxy-1-aminobenzene | Para-anisidide of 4'-hydroxy-5'-carboxy-1,2-benzoacridone | Bluish olive. |
| 4-nitro-2-methyl-1-aminobenzene | do | Olive-green. |
| 4-nitro-1-aminobenzene | do | Do. |
| 4-chloro-2-methyl-1-aminobenzene | Ortho-anisidide of 4'-hydroxy-5'-carboxy-1,2-benzoacridone | Do. |
| 5-chloro-2-methoxy-1-aminobenzene | do | Grey. |
| 2-chloro-1-aminobenzene | do | Olive-brown. |
| 4-nitro-2-methyl-1-aminobenzene | do | Olive. |
| 4-chloro-2-methyl-1-aminobenzene | 2-methyl-4-methoxy-1-anilide of 4'-hydroxy-5'-carboxy-1,2-benzoacridone | Olive-brown. |
| 5-chloro-2-methoxy-1-aminobenzene | do | Brown. |
| 3-chloro-1-aminobenzene | do | Olive-green. |
| 2-nitro-4-methoxy-1-aminobenzene | do | Olive. |
| 4-nitro-2-methyl-1-aminobenzene | do | Olive-green. |
| Do | Beta-naphthylamide of 4'-hydroxy-5'-carboxy-1,2-benzoacridone | Olive. |
| 2',3-dimethyl-4-amino-azobenzene | Anilide of 4'-hydroxy-5'-carboxy-3,4-benzo-acridone of the formula: | Do. |

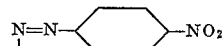

| | | |
|---|---|---|
| 2-chloro-5-methoxy-4-benzoylamino-1-aminobenzene | do | Dark green. |
| 3-nitro-1-amino-benzene | do | Brown. |
| 4'-nitro-3,6-dimethoxy-4-amino-azobenzene | do | Dark olive. |
| 1-amino-anthraquinone | do | Grey-green. |
| Do | Para-anisidide of 4'-hydroxy-5'-carboxy-3,4-benzoacridone | Olive. |
| 2,5-dichloro-1-amino-benzene | do | Brown. |
| 4,6-dimethyl-3-benzoyl-amino-1-aminobenzene | do | Green-grey. |
| 4-nitro-1-amino-benzene | do | Olive. |
| 4-nitro-2-methoxy-1-aminobenzene | do | Grey. |
| 1-aminonaphthalene | do | Olive-brown. |

2. The water-insoluble azo dyestuff of the following formula:

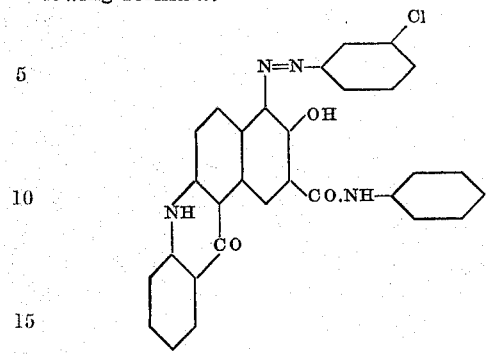

yielding, when produced on the fiber, olive-green shades of good fastness properties, particularly of good fastness to light.

3. The water-insoluble azo dyestuff of the following formula:

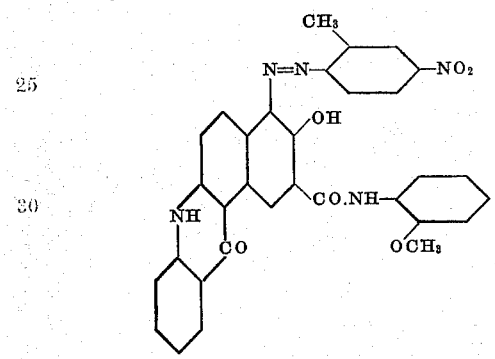

yielding, when produced on the fiber, olive shades of good fastness properties, particularly of good fastness to light.

4. The water-insoluble azo dyestuff of the following formula:

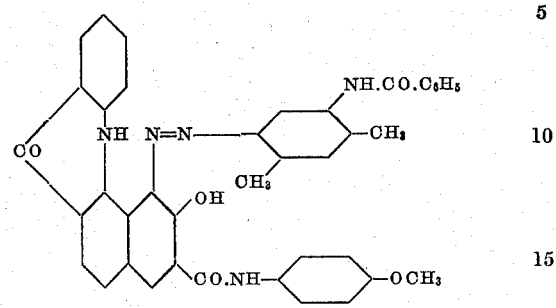

yielding, when produced on the fiber, green-grey shades of good fastness properties, particularly of good fastness to light.

5. Vegetable fiber dyed with the water-insoluble azo dyestuffs as claimed in claim 1.

6. Vegetable fiber dyed with the water-insoluble azo dyestuff as claimed in claim 2.

7. Vegetable fiber dyed with the water-insoluble azo dyestuff as claimed in claim 3.

8. Vegetable fiber dyed with the water-insoluble azo dyestuff as claimed in claim 4.

MAX LANGE.
THEODOR JACOBS.